United States Patent
Weaver

(10) Patent No.: US 7,648,314 B2
(45) Date of Patent: Jan. 19, 2010

(54) METHOD FOR MANUFACTURING A CUTTING PICK AND THE RESULTING PICK

(75) Inventor: Steven Weaver, Fletcher (AU)

(73) Assignee: Sandvik Intellectual Property AB, Sandviken (SE)

( * ) Notice: Subject to any disclaimer, the term of this patent is extended or adjusted under 35 U.S.C. 154(b) by 180 days.

(21) Appl. No.: 11/440,434

(22) Filed: May 25, 2006

(65) Prior Publication Data

US 2006/0272790 A1 Dec. 7, 2006

(30) Foreign Application Priority Data

May 31, 2005 (AU) .............................. 2005202371

(51) Int. Cl.
*B23B 27/22* (2006.01)
*B23B 27/16* (2006.01)

(52) U.S. Cl. .................... 407/114; 299/111; 175/427; 407/119

(58) Field of Classification Search ............... 299/111; 407/113, 61, 48, 40, 53, 103, 33, 34, 64, 407/119, 114; 175/427
See application file for complete search history.

(56) References Cited

U.S. PATENT DOCUMENTS

| 3,678,568 | A | | 7/1972 | Knippenberg et al. |
| 4,678,237 | A | * | 7/1987 | Collin .................... 299/112 R |
| 4,682,987 | A | | 7/1987 | Brady et al. |
| 5,324,098 | A | * | 6/1994 | Massa et al. ................. 299/111 |
| 5,417,475 | A | | 5/1995 | Graham et al. |
| 5,551,760 | A | * | 9/1996 | Sollami ....................... 299/105 |
| 5,746,281 | A | | 5/1998 | Hulkkonen |
| 6,019,434 | A | * | 2/2000 | Emmerich .................. 299/111 |
| 6,354,771 | B1 | * | 3/2002 | Bauschulte et al. ......... 407/114 |
| 6,758,530 | B2 | | 7/2004 | Sollami |
| 7,361,439 | B2 | * | 4/2008 | Wilbert et al. ................ 430/65 |

FOREIGN PATENT DOCUMENTS

| DE | 24 42 146 C2 | 3/1976 |
| EP | 0474092 A2 | 3/1992 |
| EP | 0474092 A3 | 3/1992 |
| GB | 2409209 A | 6/2005 |
| WO | 93/25795 | 12/1993 |

* cited by examiner

*Primary Examiner*—Will Fridie, Jr.
(74) *Attorney, Agent, or Firm*—Drinker Biddle & Reath LLP

(57) ABSTRACT

A cutting pick comprising a cutting tip 10 formed such as from SiC-D and a metal pick body 11. The pick body 11 has a greater coefficient of thermal expansion than the cutting tip 10. The pick body 11 includes a generally cylindrical cavity 14 within which is received a generally cylindrical anchor portion 13. The tip 10 includes a coating 17 bonded to the outer surface of the anchor portion 13. An annulus 24 is left between the coating 17 and the cavity 14 within which is a solder or braze material which bonds to each of the coating 17 and the cavity 14. The pick body 11 employs the difference in thermal expansion to exert pressure on the anchor portion 13 to fix the tip 10 to the pick body 11.

14 Claims, 1 Drawing Sheet

METHOD FOR MANUFACTURING A CUTTING PICK AND THE RESULTING PICK

BACKGROUND OF THE INVENTION

The present invention relates to a method of fixing a cutting tip to a pick body to form a cutting pick and to a cutting pick comprising a tip and a pick body which have been fixed together.

Cutting picks are used in a variety of machinery for mechanical rock excavation, such as mining, drilling and other operations, such as surface finishing or levelling for asphalt roads.

Cutting picks usually have a tip at one end thereof, which in use is the part of the pick that engages the surface for cutting purposes, and a body which supports the tip and which is fixed to the cutting machinery. Because the tip is the principal part of the pick which is subject to aggressive loads, it is also the part of the pick which is most likely to wear. Thus, it is desirable that the tip be formed of a material that has optimum characteristics to resist or minimise wear. Because such materials are usually very expensive, cutting picks often are constructed to have a pick body which is formed from one material and a cutting tip which is formed from another. This construction is usually necessitated by economy, such that the pick body, which is the major component by size of the cutting pick, is formed from a much cheaper material than the tip. For example, the pick body is often formed from heat treated steel, whereas the tip can be formed from tungsten carbide. In such constructions, the tip is usually directly fixed to the pick body by brazing. Brazing is not only compatible for bonding between a pick body and tips of these materials, but it also usually provides a sufficient bond to properly fix the pick body to the tip.

Unfortunately, brazing is not suitable for all tip materials. For example, to date it has been found that tips made of diamond composite materials, comprising diamonds which are bonded together in a silicon carbide matrix, otherwise known as silicon carbide diamond-composite ("SiC-D"), are very difficult to properly bond to a steel pick body by normal brazing and soldering techniques. One explanation for this difficulty is that SiC-D has a high carbon content which significantly reduces the ability of braze to bond to the tip. For this reason, there has been a difficulty in making use of SiC-D in cutting picks, even though SiC-D is a material which has particular characteristics that make it very desirable.

OBJECTS AND SUMMARY OF THE INVENTION

It is an object of the present invention to provide a new method for fixing a cutting tip to a pick body.

It is another object of the invention to provide a new method for fixing a cutting tip to a pick body which permits the use of materials, particularly tip materials, for which known fixing or bonding techniques do not provide commercially satisfactory fixing or bonding between the pick body and the tip.

In one aspect of the invention there is provided a method for making a cutting pick formed of a cutting tip of one material which is fixed to a pick body of another material, the pick body including a generally cylindrical cavity for receipt of a generally cylindrical anchor portion of the tip, the tip including a coating bonded to the cylindrical outer surface of the anchor portion, the internal diameter of the cavity being greater than the external diameter of the coated anchor portion to leave an annulus between the cylindrical outer surface of the coated anchor portion and the facing wall of the cavity when the anchor portion is received within the cavity, the pick body being of a metal material having a greater coefficient of thermal expansion than the material of the cutting tip, the method comprising the steps of, in any order:

(i) inserting the coated anchor portion into the cavity;
(ii) heating the tip, and the portion of the pick body defining the cavity;
(iii) introducing molten metal into the cavity, the metal being one which is selected to bond to each of the coating applied to the anchor portion and the cavity wall upon solidification of the metal,
and thereafter comprising:
(iv) cooling the tip and the pick body defining the cavity, so that:
   (a) the molten metal solidifies; and
   (b) the pick body portion defining the cavity contracts exerting sufficient pressure on the solidified metal to press the metal against the surface of the anchor portion to fix the tip to the pick body.

In another aspect of the invention there is provided a cutting pick comprising a cutting tip formed from SiC-D and a metal pick body, the pick body having a greater coefficient of thermal expansion than the cutting tip, the pick body including a generally cylindrical cavity within which is received a generally cylindrical anchor portion of the tip, the tip including a coating bonded to the cylindrical outer surface of the anchor portion, the internal diameter of the cavity being greater than the external diameter of the coated anchor portion to leave an annulus between the cylindrical outer surface of the coated anchor portion and the facing wall of the cavity, the annulus including a solder or braze material which bonds to each of the coating applied to the anchor portion and the cavity wall.

BRIEF DESCRIPTION OF THE DRAWINGS

For a better understanding For a better understanding of the invention and to show how it may be performed, embodiments thereof will now be described, by way of non-limiting example only, with reference to the accompanying drawings.

DETAILED DESCRIPTION OF THE PREFERRED EMBODIMENTS

Figure 1:
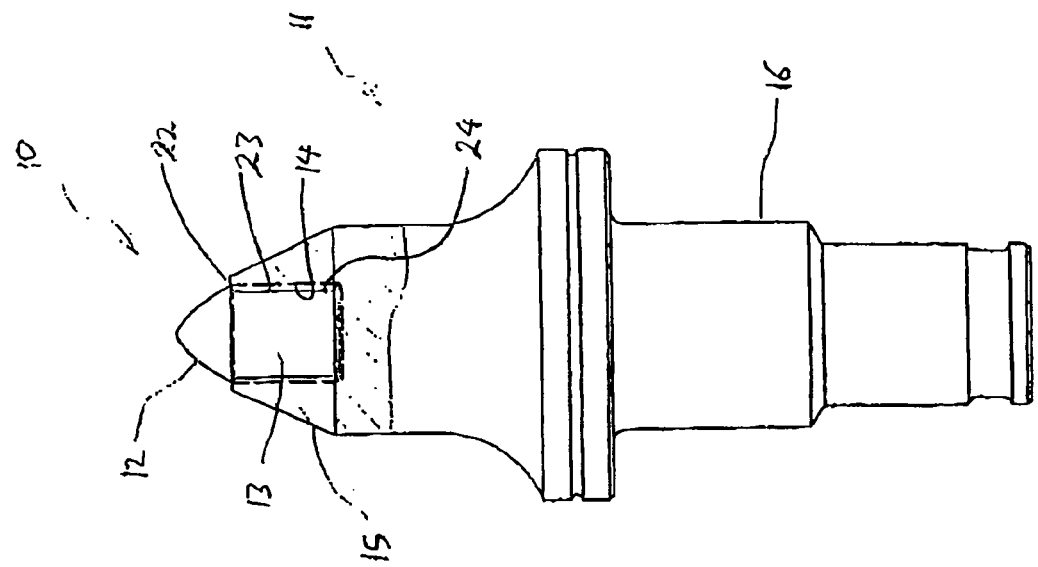
FIG. 1 is a part cross-sectional view of a cutting tip and a pick body prior to assembly.

According to the present invention, there is provided a cutting pick formed of a cutting tip of one material which is fixed to a pick body of another material, the pick body including a generally cylindrical cavity for receipt of a generally cylindrical anchor portion of the tip, the tip including a coating bonded to the cylindrical outer surface of the anchor portion, the internal diameter of the cavity being greater than the external diameter of the coated anchor portion to leave an annulus between the cylindrical outer surface of the coated anchor portion and the facing wall of the cavity when the anchor portion is received within the cavity, the pick body being of a metal material having a greater coefficient of thermal expansion than the material of the cutting tip, the method of forming the cutting pick comprising the steps of, in any order:

(i) inserting the coated anchor portion into the cavity;
(ii) heating the tip, and the portion of the pick body defining the cavity;

(iii) introducing molten metal into the cavity, the metal being one which is selected to bond to each of the coating applied to the anchor portion and the cavity wall upon solidification of the metal, and thereafter comprising:

(iv) cooling the tip and the pick body defining the cavity, so that:

(a) the molten metal solidifies; and
(b) the pick body portion defining the cavity contracts exerting sufficient pressure on the solidified metal to press the metal against the surface of the anchor portion to fix the tip to the pick body.

The invention is particularly suitable for tips made of SiC-D, by selection of a suitable coating which facilitates proper bonding of the molten metal to the anchor portion of the tip. This alleviates the previous problems associated with bonding of brazes and solders to SiC-D, because the coating which is selected is one which is compatible for attachment to the surface of the anchor portion, as well as for bonding to the molten metal upon solidification thereof. Moreover, the coating can be applied over the full surface of the anchor portion or the portion of the surface which is required for secure fixing of the cutting tip to the pick body. This facilitates an even bonding engagement between the SiC-D anchor portion and the molten metal. This distinguishes the present invention from other bonding techniques employed for SiC-D tips, such as brazing and soldering, which provide inferior bonding with the anchor portion. In such techniques, bonding may occur over certain surface sections of the anchor portion but not over the entire surface that is required. Such uneven bonding can result in an uneven pressure distribution over the surface of the anchor portion during a cutting operation and that can cause the anchor portion to fail by fracture. The invention can apply to other tip materials as well and in particular, the invention could apply to tips of tungsten carbide or silicon carbide.

The cavity of the pick body and the anchor portion of the tip preferably are cylindrical, although deviations from absolute cylindrical are within the scope of the invention. For example, the cavity and the anchor portion could have a slight complementary taper.

The method of forming a cutting pick according to the invention can further include the step of bonding the coating to the cylindrical outer surface of the anchor portion. The coating which is bonded to the anchor portion can be of any suitable material and can be applied by any suitable application process. A copper coating, applied by electroplating has been successful in trials conducted by the applicant, although it is envisaged that other coating materials and other processes for application of the coating, could be employed. For example, it is likely that the coating could alternatively be selected from cobalt, nickel, silver or manganese. Alloys of these materials might also be adopted. The thickness of the coating can be of any suitable dimension, although preferably, for a copper coating, the thickness is between about 0.02 mm and about 1.0 mm, and is preferably about 0.07 mm. The thickness of coatings of other metals can be readily defined by the skilled artisan.

Other processes for bonding the coating could include powder coating, spraying, tinning and dipping.

Method steps (i) to (iii) described above can be conducted in any order and therefore they are not restricted to the order shown. For example, the molten metal can be introduced into the cavity prior to insertion of the anchor portion, if desired.

The anchor portion is easily inserted into the cavity given that the diameter of the anchor portion, including the coating, is less than that of the cavity. The difference in diameter is such as to create an annulus between the outer cylindrical surface of the coated anchor portion and the facing wall of the cavity, to accommodate the molten metal, whether or not the molten metal is introduced into the cavity before or after insertion of the anchor portion into the cavity. In one example, the diameter of the coated anchor portion is 16.10 mm and the diameter of the cavity is 16.70 mm. These dimensions can of course vary and their selection should be within the normal skill of a person skilled in the art.

The molten metal which is introduced into the cavity preferably is a solder material that can fuse to the coating applied to the anchor portion, as well as to the cavity wall. Preferably the solder is a silver solder. Alternatively, the molten metal can be a braze, such as a bronze braze, while other suitable materials can include a tin/silver soft solder, or a nickel based braze material.

The pick body which defines the cavity can be of any suitable metal material and usually will be steel, for example heat treated steel or stainless steel. The invention is not however limited to steel for the pick body and other materials are within the scope of the invention. For example, a nickel alloy could be employed.

Preferably the molten metal is introduced into the cavity by placing a solid metal tab or ingot into the cavity and heating the tab or ingot to melt. The heating which takes place in the method step (ii) above can be sufficient to melt the tab or ingot. Thus, method step (iii) can be achieved by first placing the metal tab or ingot into the cavity and thereafter proceeding with method step (ii), so that the tab or ingot melts. In this order, method step (i) can be prior to method step (ii), or after it, following melting of the metal tab or ingot. In the preferred arrangement, a metal tab or ingot is employed along with a wire of the same metal. In this arrangement, the tab or ingot melts or liquefies when the heating step (ii) takes place and the metal wire can be introduced into the cavity as required to fill it or the annulus or in other words, to top up the cavity or the annulus, as required. The wire typically will be of small gauge in order to be fed into the cavity or the annulus and would melt upon introduction into the cavity or annulus, possibly upon coming into contact with a surface of the cavity or the tip, or with the already molten metal.

Alternatively the molten metal could be provided by feeding from a supply. In this arrangement, the molten metal can be fed or poured into the cavity or the annulus.

Heating of the tip and the portion of the pick body defining the cavity can be achieved in any suitable manner such as by induction heating, gas flame heating, or furnace heating. It is preferred that the heating temperature is about the same for both the tip and the pick body, although the actual temperature will depend on the respective materials of the tip and the pick body. The tip and the pick body can be heated together or separately as required.

In the preferred arrangement in which the pick body is of steel, the temperature of heating in the method step (ii) preferably is set to cause the metallic structure of the portion of the pick body which defines the cavity to turn austenitic. The method step (iv) of cooling the pick body and tip preferably then causes the metallic structure of the pick body portion which defines the cavity to turn martensitic. Quenching is one form of cooling that can achieve a martensitic structure from an austenitic structure.

Upon cooling, the molten metal solidifies and forms a medium through which pressure, generated by contraction of the pick body that surrounds the cavity, is transferred to the anchor portion of the tip to securely hold the tip. Advantageously, by the method of the invention, the pressure of contraction can be evenly transferred to the anchor portion through the solidified medium, thereby reducing the likelihood that the anchor portion will fracture through uneven pressure distribution.

Importantly, the manner by which the tip is fixed to the pick body is not solely reliant on fusion between the molten metal, the pick body and the anchor portion, but rather, the pressure exerted by the pick body through the solidified metal to the anchor portion provides a significant fixing load and in the preferred arrangement, the major fixing load.

Cooling of the pick body and the tip can be conducted in any suitable manner and at any suitable rate. In the preferred arrangement, the cooling can be by quenching, such as by dipping the pick into a body of a suitable liquid such as oil. The temperature of the liquid can be controlled at the desired quenching temperature. Quenching could alternatively be polymer or water quenching. Cooling can alternatively be achieved in other ways, and for example, the pick could be cooled by inert gas, e.g. nitrogen, or forced air cooled.

Figure 2:
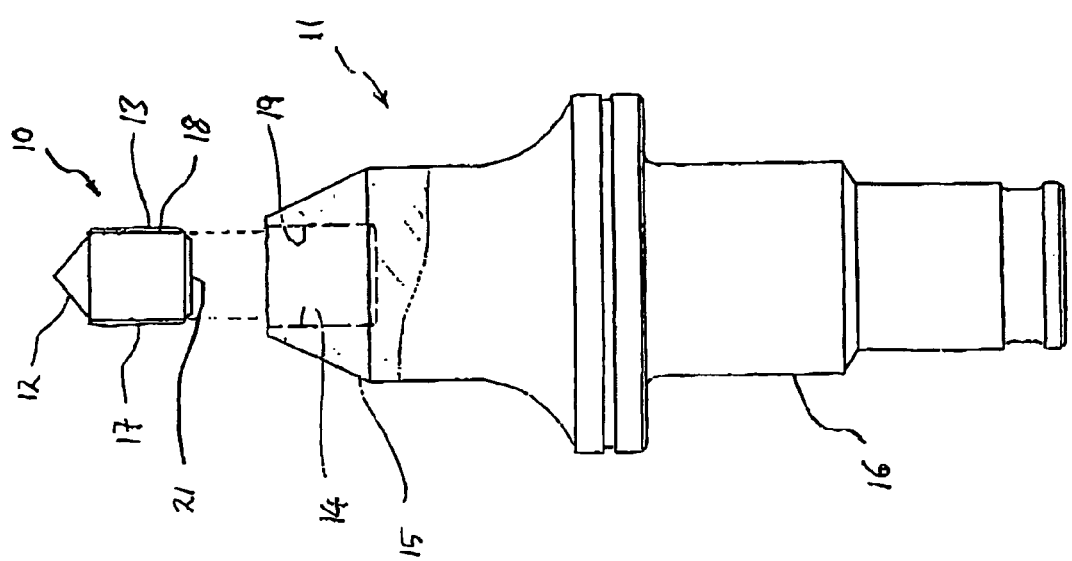
FIG. 2 illustrates the cutting tip and pick body of FIG. 1 in an assembled condition.

Referring to FIGS. 1 and 2, a cutting tip 10 is shown separated from a pick body 11. The cutting tip 10 includes a tip head 12 and an anchor portion 13. The anchor portion 13 is cylindrical and is arranged for loose receipt within a cavity 14 formed in a neck portion 15 (shown in cross-section) of the pick body 11. As a person skilled in the art would readily appreciate the form of the pick body 11 illustrated in FIG. 1, it is not necessary to further describe particular aspects of the body 11, such as to describe the shank 16, and therefore further discussion will take place in respect of the manner in which the cutting tip 10 is fixed to the pick body 11.

With suitable cutting tip and pick body materials, the normal manner of fixing the cutting tip 10 into the cavity 14 is by brazing or soldering directly between the anchor portion 13 and the wall 19 of the cavity 14. As discussed hereinbefore, the present invention is concerned principally with the fixing of cuttings tips to pick bodies in which the material of the cutting tip is not compatible for direct brazing or soldering to the pick body. A suitable example of such incompatibility, would occur if the cutting tip 10 was made of SiC-D and the pick body is of steel. In such an arrangement, the method of the invention can be adopted to provide for a suitable fixing between the cutting tip 10 and the pick body 11.

FIG. 1 illustrates a coating 17 which has been applied to the outer cylindrical surface 18 of the anchor portion 13. The coating 17 commences at the cutting head 12 and extends substantially to the base end 21 of the anchor portion 13. In respect of a cutting tip 10 made of SiC-D, the coating 17 can be a copper coating and the manner of application can be by electroplating.

FIG. 2 shows the cutting tip 10 and the pick body 11 assembled together, so that the anchor portion 13 is received within the cavity 14.

FIG. 2 illustrates the spacing between the outer surface 23 of the coating 17 and the cavity surface 19. The spacing forms an annulus 24 which extends fully about the anchor portion 13.

By the method of the invention, the annulus is arranged to receive molten metal which is compatible for fusing evenly with the coating 17 and the cavity surface 19.

As discussed earlier herein, the method steps for inserting the anchor portion 13 into the cavity 14, heating the cutting tip 10 and the neck portion 15, and introducing molten metal into the annulus 24, can be conducted in any suitable order.

It is to be appreciated, that a characteristic of the present invention is that the neck portion 15 has a greater co-efficient of thermal expansion than the cutting tip 10 so that when the tip and the pick body are cooled, the volume of the annulus 24 will reduce as the neck portion 15 contracts to a greater extent than the anchor portion 13. Thus, while the molten metal remains molten, as cooling continues, the metal will be squeezed to flow upwardly within the annulus 24 and with careful selection of the amount of molten metal which is introduced into the annulus 24, upon solidification of the molten metal, the cavity 14 will be filled to the height of the coating 17. If that height is not reached, then, as described earlier, additional molten metal can be introduced, such as through metal wire.

In trials conducted by the applicant, the coefficient of thermal expansion of a steel pick body is $12.3 \times 10^{-6} \, °C.^{-1}$, while the coefficient of the SiC-D tip is $2.0 \times 10^{-6} \, °C.^{-1}$. Thus, the steel of the pick body will contract and expand approximately six times the material of the tip.

According to the present invention, cooling of the cutting pick causes the molten metal to solidify and the solidus temperature is dependent on the metal which is chosen. In trials already conducted, a silver solder has been employed as the molten metal and this has a solidus temperature of about 620° C. Other metals or alloys could have a melting point which is either higher or lower than this. For example, the solidus temperature could be between 100° C. and 1400° C., and preferably between 220° C. and 880° C.

Upon solidification of the molten metal, further upward movement of that metal will cease, and pressure which is applied to the solidified metal through the contracting neck portion 15 will be transferred to the anchor portion 13. The various parameters of the method of the invention can be arranged so that solidification occurs during cooling of the cutting pick which allows sufficient contraction pressure to be exerted through the solidified metal to the anchor portion.

When complete cooling of the cutting pick has taken place, maximum contraction pressure will have been exerted on the anchor portion. Again, by careful selection of the parameters of the cutting pick components, the pressure will be sufficient to securely hold at the anchor portion 13 within the cavity 14.

The invention thus provides a unique method by which a tip of a material which is not compatible for brazing or soldering direct to a pick body, can nevertheless be firmly fixed in place in a relatively simple and inexpensive manner. While the method is more complex than a simple brazing arrangement, the benefit is obtained in that a cutting pick having a tip of a material which is more specifically suited to the type of surface being cut, e.g. hard rock, is provided.

Throughout the description and claims of this specification the word "comprise" and variations of that word, such as "comprises" and "comprising", are not intended to exclude other additives or components or integers.

The disclosures in Australian patent application No. 2005202371, from which this application claims priority are incorporated herein by reference Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A cutting pick comprising a cutting tip formed from SiC-D and a metal pick body, the pick body having a greater coefficient of thermal expansion than the cutting tip, the pick body including a generally cylindrical cavity within which is received a generally cylindrical anchor portion of the tip, the tip including a coating bonded to the cylindrical outer surface of the anchor portion, the internal diameter of the cavity being greater than the external diameter of the coated anchor portion to leave an annulus between the cylindrical outer surface of the coated anchor portion and the facing wall of the cavity, the annulus including a solder or braze material which bonds to each of the coating applied to the anchor portion and the cavity wall.

2. The cutting pick of claim 1, wherein said coating is selected from copper, cobalt, nickel, silver or manganese, or alloys of these materials.

3. The cutting pick of claim 1, wherein said pick body is formed from steel, stainless steel or a nickel alloy.

4. The cutting pick of claim 1, wherein the solder or braze material fills the annulus to an upper surface of the wall of the cavity.

5. The cutting pick of claim 1, wherein the walls of the cavity place a compressive force on the anchor portion of the cutting tip.

6. A cutting pick comprising:

a cutting tip formed from diamond composite material; and a metal pick body, wherein the pick body has a coefficient of thermal expansion that is greater than a coefficient of thermal expansion of the cutting tip, wherein the pick body includes a cavity within which is received an anchor portion of the cutting tip, wherein the cutting tip includes a coating bonded to at least a portion of an outer surface of the anchor portion, wherein an internal diameter of the cavity is greater than an external diameter of the coated outer surface of the anchor portion to leave an annulus between the coated outer surface of the anchor portion and a wall of the cavity facing the coated outer surface of the anchor portion, and wherein the annulus includes a solder or braze material which bonds to each of the portion of the outer surface of the anchor portion that is coated and the wall of the cavity.

7. The cutting pick of claim 6, wherein said coating is selected from copper, cobalt, nickel, silver or manganese, or alloys of these materials.

8. The cutting pick of claim 6, wherein said pick body is formed from steel, stainless steel or a nickel alloy.

9. The cutting pick of claim 6, wherein the diamond composite material comprises diamonds bonded together in a silicon carbide matrix.

10. The cutting pick of claim 6, wherein the coating is applied to an entire surface of the anchor portion of the cutting tip.

11. The cutting pick of claim 6, wherein the walls of the cavity and the anchor portion of the cutting tip are cylindrical.

12. The cutting pick of claim 6, wherein the walls of the cavity and the anchor portion of the cutting tip are complementary tapered.

13. The cutting pick of claim 6, wherein the solder or braze material fills the annulus to an upper surface of the wall of the cavity.

14. The cutting pick of claim 6, wherein the walls of the cavity place a compressive force on the anchor portion of the cutting tip.

* * * * *